United States Patent
Yoo et al.

(10) Patent No.: US 11,360,752 B2
(45) Date of Patent: Jun. 14, 2022

(54) ELECTRONIC DEVICE PERFORMING RESTORATION ON BASIS OF COMPARISON OF CONSTANT VALUE AND CONTROL METHOD THEREOF

(71) Applicant: SAMSUNG ELECTRONICS CO., LTD., Suwon-si (KR)

(72) Inventors: Sungbae Yoo, Suwon-si (KR); Seolheui Kim, Suwon-si (KR); Yeji Kim, Suwon-si (KR); Taesoo Kim, Suwon-si (KR); Jinbum Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/173,868

(22) Filed: Feb. 11, 2021

(65) Prior Publication Data

US 2021/0255841 A1 Aug. 19, 2021

Related U.S. Application Data

(60) Provisional application No. 62/976,472, filed on Feb. 14, 2020.

(30) Foreign Application Priority Data

Jun. 2, 2020 (KR) .................. 10-2020-0066610

(51) Int. Cl.
*G06F 8/41* (2018.01)
(52) U.S. Cl.
CPC .................. *G06F 8/434* (2013.01)

(58) Field of Classification Search
CPC ....................................... G06F 8/434
See application file for complete search history.

(56) References Cited

U.S. PATENT DOCUMENTS

| | | | | |
|---|---|---|---|---|
| 5,724,589 A * | 3/1998 | Wold | ....... | G06F 9/542 717/100 |
| 7,650,504 B2 * | 1/2010 | Bodrov | ....... | G06F 21/55 713/1 |
| 2007/0055885 A1 | 3/2007 | Yamazaki et al. | | |
| 2011/0296389 A1 | 12/2011 | Oliva | | |
| 2013/0318514 A1 * | 11/2013 | Neeman | ....... | G06F 16/40 717/168 |
| 2014/0365862 A1 | 12/2014 | Qu et al. | | |

(Continued)

FOREIGN PATENT DOCUMENTS

KR 10-1827143 B1 2/2018

OTHER PUBLICATIONS

International Search Report and Written Opinion dated May 13, 2021, issued by the International Searching Authority in International Application No. PCT/KR2021/001760 (PCT/ISA/210 and 237).

*Primary Examiner* — Phillip H Nguyen
(74) *Attorney, Agent, or Firm* — Sughrue Mion, PLLC

(57) ABSTRACT

An electronic device includes a memory storing one or more instructions, and at least one processor configured to execute the one or more instructions to identify whether an annotation binding a first type object and a second type object is declared, and bind the first type object and the second type object, and sign both the bound first type object and the bound second type object based on identifying that the annotation is declared.

20 Claims, 6 Drawing Sheets

(56) References Cited

U.S. PATENT DOCUMENTS

| | | |
|---|---|---|
| 2016/0163015 A1 | 6/2016 | Riguer et al. |
| 2018/0095764 A1 | 4/2018 | Sultana et al. |
| 2019/0034664 A1* | 1/2019 | Barnes .................. G06F 21/121 |
| 2019/0146817 A1 | 5/2019 | Tirumala et al. |
| 2020/0125742 A1* | 4/2020 | Kounavis .............. H04L 9/0869 |

* cited by examiner

```
struct action {
    handler_t handler;
    const char *name;
};
```

FIG.3

```
int request(const char *name,
            irq_handler_t handler) {
    action *h;
    h->name = name;
    h->handler = POINTER_SIGN(h->handler);
    ....
}
```

FIG.4

```
void dispatcher(const char *name) {
    action * h;
    h = find_action(name);
    h->handler = CHECK_POINTER_AND_RESTORE(h->handler)
    h->handler();
}
```

FIG.5

```
struct action {
    handler_t handler;
    const char *name;
} __attribute__ (objbind(handler, name)) ;
```

FIG.8

```
int request(const char *name,
            irq_handler_t handler) {
    action *h;
    h->name = name;
    h->handler = COMBINED_POINTER_SIGN(h->handler, name);
    ....
}
```

FIG.9

```
void dispatcher(const char *name) {
    action * h;
    h = find_action(name);
    h->handler =CHECK_COMBINED_POINTER_AND_RESTORE
                (h->handler, name)
    h->handler();
}
```

FIG.10

ELECTRONIC DEVICE PERFORMING RESTORATION ON BASIS OF COMPARISON OF CONSTANT VALUE AND CONTROL METHOD THEREOF

CROSS-REFERENCE TO RELATED APPLICATION(S)

This application is based on and claims priority under 35 U.S.C. § 119 to Korean Patent Application No. 10-2020-0066610, filed on Jun. 2, 2020, in the Korean Intellectual Property Office, and U.S. Provisional Application No. 62/976,472, filed on Feb. 14, 2020, in the U.S. Patent and Trademark Office, the disclosures of which are incorporated by reference herein in their entireties.

BACKGROUND

1. Field

The disclosure relates to controlling an electronic device, and more particularly controlling an electronic device to performing restoration based on a comparison result of constant value and a control method thereof.

2. Description of Related Art

Various services and additional functions provided through electronic devices such as portable electronic devices such as smart phones are gradually increasing. In order to increase the utility value of such electronic devices and satisfy the needs of various users, communication service providers or electronic device manufacturers provide various functions and develop electronic devices competitively to differentiate them from other companies. Accordingly, various functions provided through electronic devices are becoming increasingly sophisticated.

SUMMARY

According to an aspect of the disclosure, an electronic device includes: a memory storing one or more instructions; and at least one processor configured to execute the one or more instructions to identify whether an annotation binding a first type object and a second type object is declared, and bind the first type object and the second type object, and sign both the bound first type object and the bound second type object based on identifying that the annotation is declared.

The first type object may include a pointer, and the second type object may include a constant.

The annotation may be declared after the second type object is declared.

The annotation may be declared as objbind (handler, name), handler may correspond to the first type object, and name may correspond to the second type object.

The second type object and the first type object may be concurrently signed.

The at least one processor may be further configured to execute the one or more instructions to restore the signed first type object and the signed second type object according to a restore command for the signed first type object and the signed second type object.

The at least one processor may be further configured to execute the one or more instructions to determine whether a value indicated by the bound second type object and a value indicated by the signed second type object match each other.

The at least one processor may be further configured to execute the one or more instructions to perform a restore based on determining that the value indicated by the bound second type object and the value indicated by the signed second type object match each other.

The at least one processor may be further configured to execute the one or more instructions to process a restore as a failure based on determining that the value indicated by the bound second type object and the value indicated by the signed second type object do not match each other.

The at least one processor may be further configured to execute the one or more instructions to perform a restore operation based on determining that the value indicated by the bound first type object and the value indicated by the signed first type object match each other.

According to an aspect of the disclosure, a method of controlling an electronic device includes: identifying whether an annotation binding a first type object and a second type object is declared; and binding the first type object and the second type object, and signing both the bound first type object and the bound second type object based on identifying that the annotation is declared.

The first type object may include a pointer, and the second type object may include a constant.

The annotation may be declared after the second type object is declared.

The annotation may be declared as objbind (handler, name), handler corresponds to the first type object, and name corresponds to the second type object.

The second type object and the first type object may be concurrently signed.

The method may further include restoring the signed first type object and the signed second type object according to a restore command for the signed first type object and the signed second type object.

The method may further include determining whether a value indicated by the bound second type object and a value indicated by the signed second type object match each other.

The method may further include performing a restore based on determining that the value indicated by the bound second type object and the value indicated by the signed second type object match each other.

The method may further include processing a restore as a failure when the value indicated by the bound second type object and the value indicated by the signed second type object do not match each other.

The method may further include performing a restore operation based on determining that the value indicated by the bound first type object and the value indicated by the signed first type object match each other.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 3 is a diagram illustrating an operation in which a pointer and a constant are declared according to the prior art;

FIG. 4 is a diagram illustrating a declaration for signing a pointer according to the prior art;

FIG. 5 is a diagram illustrating a declaration for performing a restore on a signed pointer according to the prior art;

FIG. 8 is a diagram illustrating an operation in which a pointer and a constant are declared according to an embodiment;

FIG. 9 is a diagram illustrating a declaration for signing a pointer according to an embodiment; and FIG. 10 is a diagram illustrating a declaration for performing a restore of a signed pointer according to an embodiment.

DETAILED DESCRIPTION

Figure 1:
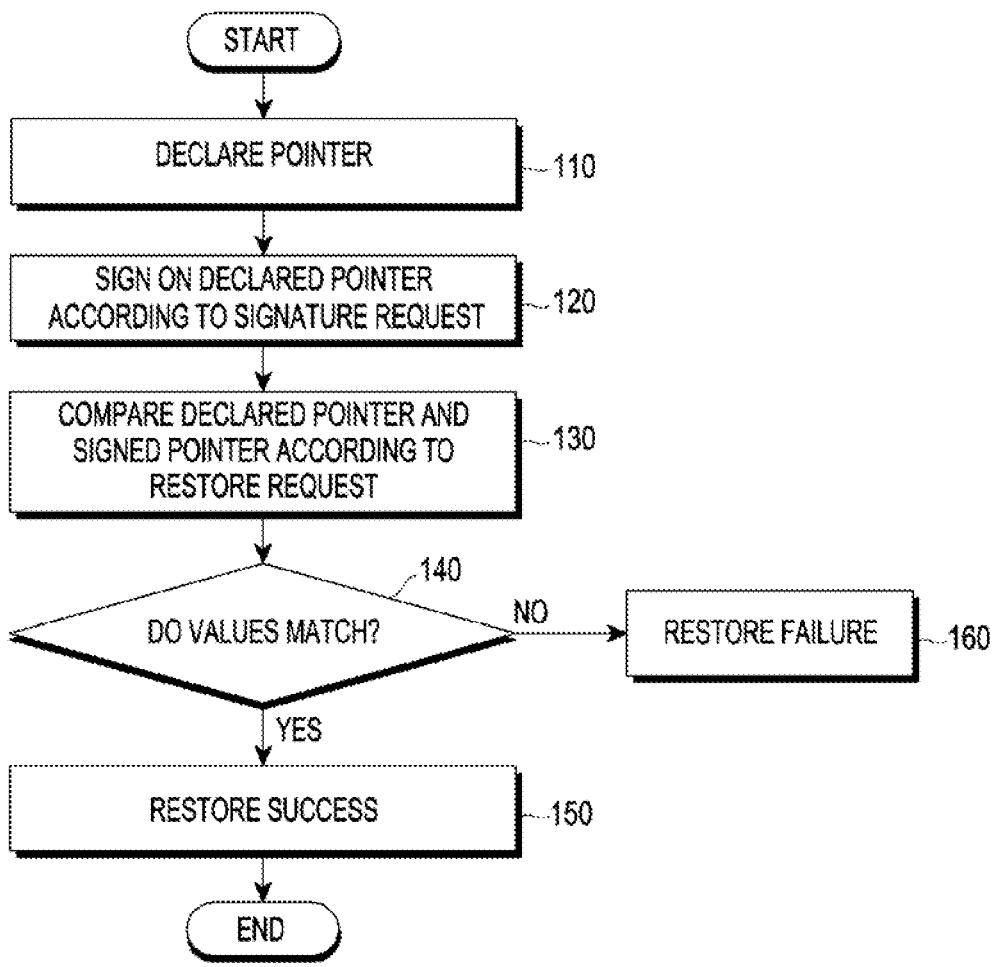
FIG. 1 is a diagram for verifying control flow integrity according to the related art.

Embodiments described herein are provided as examples to assist in the understanding of the disclosure, and various modifications may be made to and practiced. However, in describing the disclosure, in case it is determined that the detailed description of related known technologies may unnecessarily confuse the gist of the disclosure, the detailed description and detailed drawing will be omitted. With regard to the description of the drawings, similar reference numerals may be used to designate similar or relevant elements.

It is to be understood that a singular form of a noun corresponding to an item may include one or more of the things, unless the relevant context clearly indicates otherwise. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

FIG. 1 is a diagram for verifying control flow integrity according to the related art.

Referring to FIG. 1, an electronic device according to the related art may declare a pointer in operation 110. According to the related art, the declaration of a pointer may be declared through a declaration statement such as "handler_t handler".

The electronic device according to the related may sign the declared pointer according to the signature declaration in operation 120. Such an operation is described as a code such as "h→handler=POINTER_SIGN (h→handler);" in FIG. 3.

The electronic device according to the related art may determine whether a pointer declared in operation 110 and a pointer signed in operation 120 are pointers having the same pointer value according to a restoration declaration in operation 130. This operation is described as a code such as "h→handler=CHECK_POINTER_AND_RESTORE (h→handler)" in FIG. 4.

In operation 140, the electronic device according to the related art may determine whether a pointer value of a pointer declared in operation 110 and a pointer signed in operation 120 match. This operation is described as a code such as "h→handler=CHECK_POINTER_AND_RESTORE (h→handler)" in FIG. 5. When the pointer declared in operation 110 and the pointer signed in operation 120 are pointers having the same pointer value, in operation 150, a restore operation may be performed and may be processed as a "restore success". If the pointer declared in operation 110 and the pointer signed in operation 120 are not pointers having the same pointer value, in operation 160, a restore operation may not be performed and may be processed as a "restore failure". As described above, in order to perform a restore operation, an electronic device according to the related art performs a signature on only the pointer itself, compares the pointer values, and performs the restore operation according to the comparison result to verify integrity.

Figure 2:
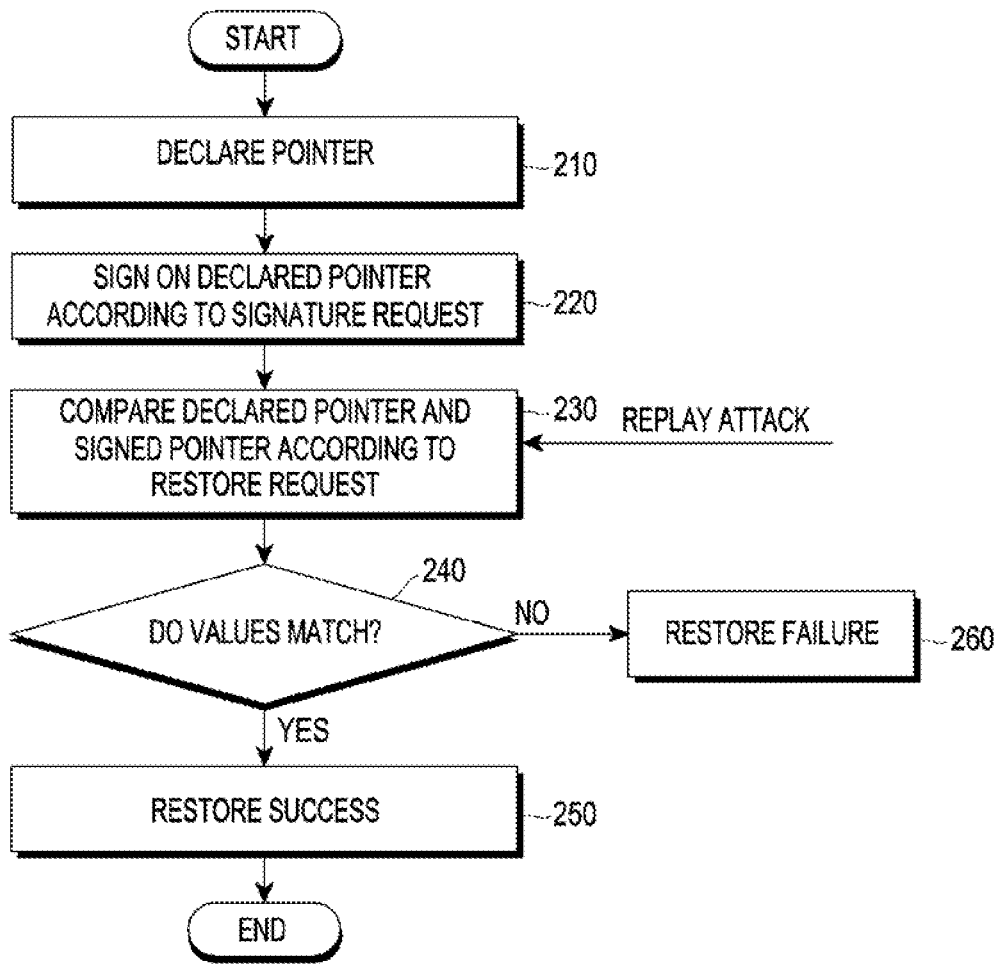
FIG. 2 is an exemplary diagram illustrating a case in which a replay attack is performed on a specific operation in an operation for verifying control flow integrity according to the related art.

However, as shown in FIG. 2, when a pointer signed by another thread or at a different time point is used in an operation of comparing pointer values (e.g., operation 230), if a pointer signed in another thread or at a different point in time is the same as the pointer declared in operation 110, the restore operation may be performed. Accordingly, there is a problem that it is difficult to completely guarantee the integrity of the control flow.

Figure 6:
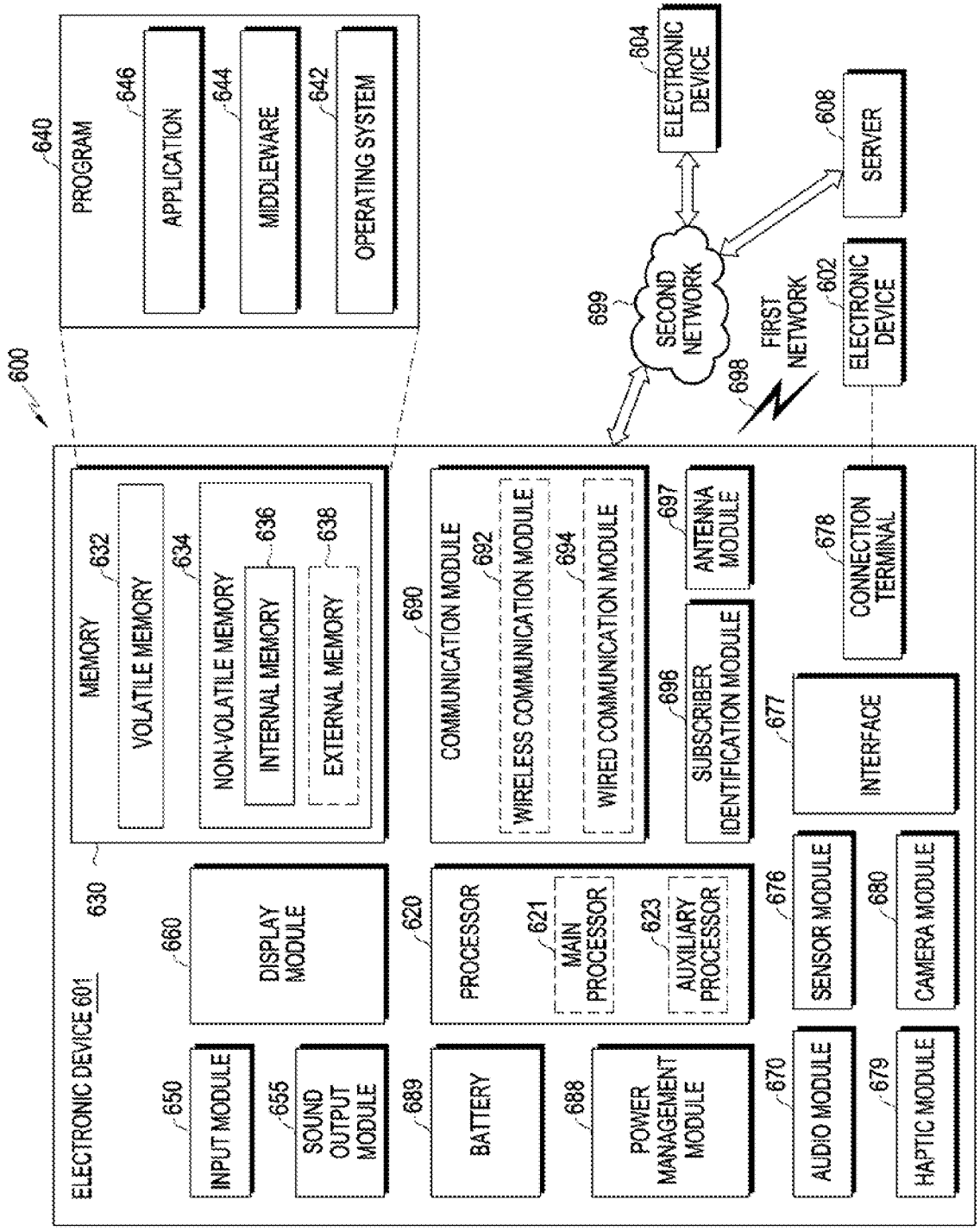
FIG. 6 is a diagram illustrating an electronic device according to an embodiment.

FIG. 6 is a block diagram of an electronic device 601 in a network environment 600 according to an embodiment. Referring to FIG. 6, in the network environment 600, the electronic device 601 may communicate with an electronic device 602 through a first network 698 (e.g., a short-range wireless communication network), or communicate with an electronic device 604 or a server 608 through a second network 699 (e.g., a long-distance wireless communication network). According to an embodiment, the electronic device 601 may communicate with the electronic device 604 through the server 608. According to an embodiment, the electronic device 601 may include a processor 620, a memory 630, an input device 650, an audio output device 655, a display device 660, an audio module 670, a sensor module 676, an interface 677, a haptic module 679, a camera module 680, a power management module 688, a battery 689, a communication module 690, a subscriber identification module 696, and/or an antenna module 697. In some embodiments, at least one of these components (e.g., the display device 660 or the camera module 680) may be omitted or one or more other components may be added to the electronic device 601. In some embodiments, some of these components may be implemented as one integrated circuit. For example, the sensor module 676 (e.g., a fingerprint sensor, an iris sensor, or an illuminance sensor) may be implemented while being embedded in the display device 660 (e.g., a display).

The processor 620 may, for example, execute software (e.g., a program 640) to control at least one other component (e.g., a hardware or software component) of the electronic device 601 connected to the processor 620 and may perform various data processing or operations. According to an embodiment, as at least part of data processing or operation, the processor 620 may load the command or data received from another component (e.g., the sensor module 676 or the communication module 690) into the volatile memory 632, process the command or data stored in a volatile memory 632, and store the result data in a nonvolatile memory 634. According to an embodiment, the processor 620 may include a main processor 621 (e.g., a central processing unit or an application processor), and an auxiliary processor 623 (e.g., graphics processing unit, image signal processor, sensor hub processor, or communication processor) that can be operated independently or together with the main processor 621. Additionally or alternatively, the coprocessor 623 may be configured to use lower power than the main processor 621 or to be specialized for a designated function. The secondary processor 623 may be implemented separately from the main processor 621 or as a part thereof.

The auxiliary processor 623 may control at least some of functions or states related to at least one of the components of the electronic device 601 (e.g., the display device 660, the sensor module 676, or the communication module 690), for example, on behalf of the main processor 621 while the main processor 621 is in an inactive (e.g. sleep) state, or with the main processor 621 while the main processor 621 is in an active (e.g., application execution) state. According to an embodiment, the auxiliary processor 623 (e.g., an image signal processor or a communication processor) may be implemented as part of another functionally related component (e.g., a camera module 680 or a communication module 690).

The memory 630 may store various data used by at least one component of the electronic device 601 (e.g., the processor 620 or the sensor module 676). The data may include, for example, software (e.g., the program 640), and input data or output data for commands related thereto. The memory 630 may include a volatile memory 632 or a nonvolatile memory 634.

The program 640 may be stored as software in the memory 630 and may include, for example, an operating system 642, middleware 644, or an application 646.

The input device 650 may receive a command or data to be used for the components (e.g., the processor 620) of the electronic device 601 from outside the electronic device 601 (e.g., a user). The input device 650 may include, for example, a microphone, a mouse, a keyboard, or a digital pen (e.g., a stylus pen).

The sound output device 655 may output an sound signal to the outside of the electronic device 601. The sound output device 655 may include, for example, a speaker or a receiver. The speaker may be used for general purposes such as multimedia playback or recording playback, and the receiver can be used to receive an incoming call. According to an embodiment, the receiver may be implemented separately from the speaker or as part thereof.

The display device 660 may visually provide information to the outside of the electronic device 601 (e.g., a user). The display device 660 may include, for example, a display, a hologram device, or a projector and a control circuit for controlling the device. According to an embodiment, the display device 660 may include a touch circuitry configured to sense a touch, or a sensor circuit (e.g., a pressure sensor) configured to measure the strength of a force generated by the touch.

The audio module 670 may convert sound into an electric signal, or conversely, convert an electric signal into sound. According to an embodiment, the audio module 670 may acquire sound through the input device 650, or may output sound through the sound output device 655 or an external electronic device (e.g., electronic device 602) (e.g., speaker or headphones) directly or wirelessly connected to the electronic device 601.

The sensor module 676 may detect an operating state (e.g., power or temperature) of the electronic device 601 or an external environmental state (e.g., a user state), and generate an electrical signal or data value corresponding to the detected state. According to an embodiment, the sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more designated protocols that may be used for the electronic device 601 to connect directly or wirelessly to an external electronic device (e.g., the electronic device 602). According to an embodiment, the interface 677 may include, for example, a high definition multimedia interface (HDMI), a universal serial bus (USB) interface, an SD card interface, or an audio interface.

The connection terminal 678 may include a connector through which the electronic device 601 can be physically connected to an external electronic device (e.g., the electronic device 602). According to an embodiment, the connection terminal 678 may include, for example, an HDMI connector, a USB connector, an SD card connector, or an audio connector (e.g., a headphone connector).

The haptic module 679 may convert an electrical signal into a mechanical stimulus (e.g., vibration or movement) or an electrical stimulus that a user can perceive through a tactile or motor sense. According to an embodiment, the haptic module 679 may include, for example, a motor, a piezoelectric element, or an electrical stimulation device.

The camera module 680 may capture a still image and a video. According to an embodiment, the camera module 680 may include one or more lenses, image sensors, image signal processors, or flashes.

The power management module 688 may manage power supplied to the electronic device 601. According to an embodiment, the power management module 688 may be implemented as at least a part of, for example, a power management integrated circuit (PMIC).

The battery 689 may supply power to at least one component of the electronic device 601. According to an embodiment, the battery 689 may include, for example, a non-rechargeable primary cell, a rechargeable secondary cell, or a fuel cell.

The communication module 690 may establish a direct (or wired) communication channel or wireless communication channel and perform communication through the established communication channel between the electronic device 601 and an external electronic device (e.g., the electronic device 602, the electronic device 604, or a server 608). The communication module 690 may be operated independently of the processor 620 (e.g., an application processor) and may include one or more communication processors that support direct (e.g., wired) communication or wireless communication. According to an embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN)) communication module, or a power line communication module). Among these communication modules, a corresponding communication module may communicate with an external electronic device through a first network 698 (e.g., a short-range communication network such as Bluetooth, WiFi direct or IrDA (infrared data association)) or a second network 699 (e.g., a telecommunication network such as a cellular network, the Internet, or a computer network (e.g., LAN or WAN)). These various types of communication modules may be integrated into one component (e.g., a single chip), or may be implemented as a plurality of separate components (e.g., multiple chips). The wireless communication module 692 may identify and authenticate the electronic device 601 in a communication network such as the first network 698 or the second network 699 using subscriber information (e.g., international mobile subscriber identifier (IMSI)) stored in the subscriber identification module 696.

The antenna module 697 may transmit a signal or power to the outside (e.g., an external electronic device) or receive from the outside. According to an embodiment, the antenna module may include one antenna including a conductor formed on a substrate (e.g., a PCB) or a radiator formed of a conductive pattern. According to an embodiment, the antenna module 697 may include a plurality of antennas. In this case, at least one antenna suitable for a communication method used in a communication network such as the first network 698 or the second network 699 may be selected from the plurality of antennas by, for example, the communication module 690. The signal or power may be transmitted or received between the communication module 690 and an external electronic device through the selected at least one antenna. According to some embodiments, components other than the radiator (e.g., RFIC) may be additionally formed as part of the antenna module 697.

At least some of the components are connected to each other through a communication method (e.g., bus, general purpose input and output (GPIO), serial peripheral interface (SPI), or mobile industry processor interface (MIPI))) between peripheral devices and exchange signals (e.g., commands or data) with each other.

According to an embodiment, the command or data may be transmitted between the electronic device 601 and an external electronic device 604 through the server 608 connected to the second network 699. Each of the electronic devices 602 and 604 may be the same or different types of devices as the electronic device 601. According to an embodiment, all or part of the operations executed by the electronic device 601 may be executed by one or more of the external electronic devices 602, 604, or 608. For example, when the electronic device 601 needs to perform a function or service automatically or in response to a request from a user or another device, the electronic device 601 may request one or more external electronic devices to perform the function or at least part of the service instead of or in addition to executing the function or service by itself. One or more external electronic devices that have received the request may execute at least a part of the requested function or service, or an additional function or service related to the request, and transmit the execution result to the electronic device 601. The electronic device 601 may process the result as it is or additionally and provide the same as at least a part of a response to the request. To this end, for example, cloud computing, distributed computing, or client-server computing technology may be used.

Figure 7:
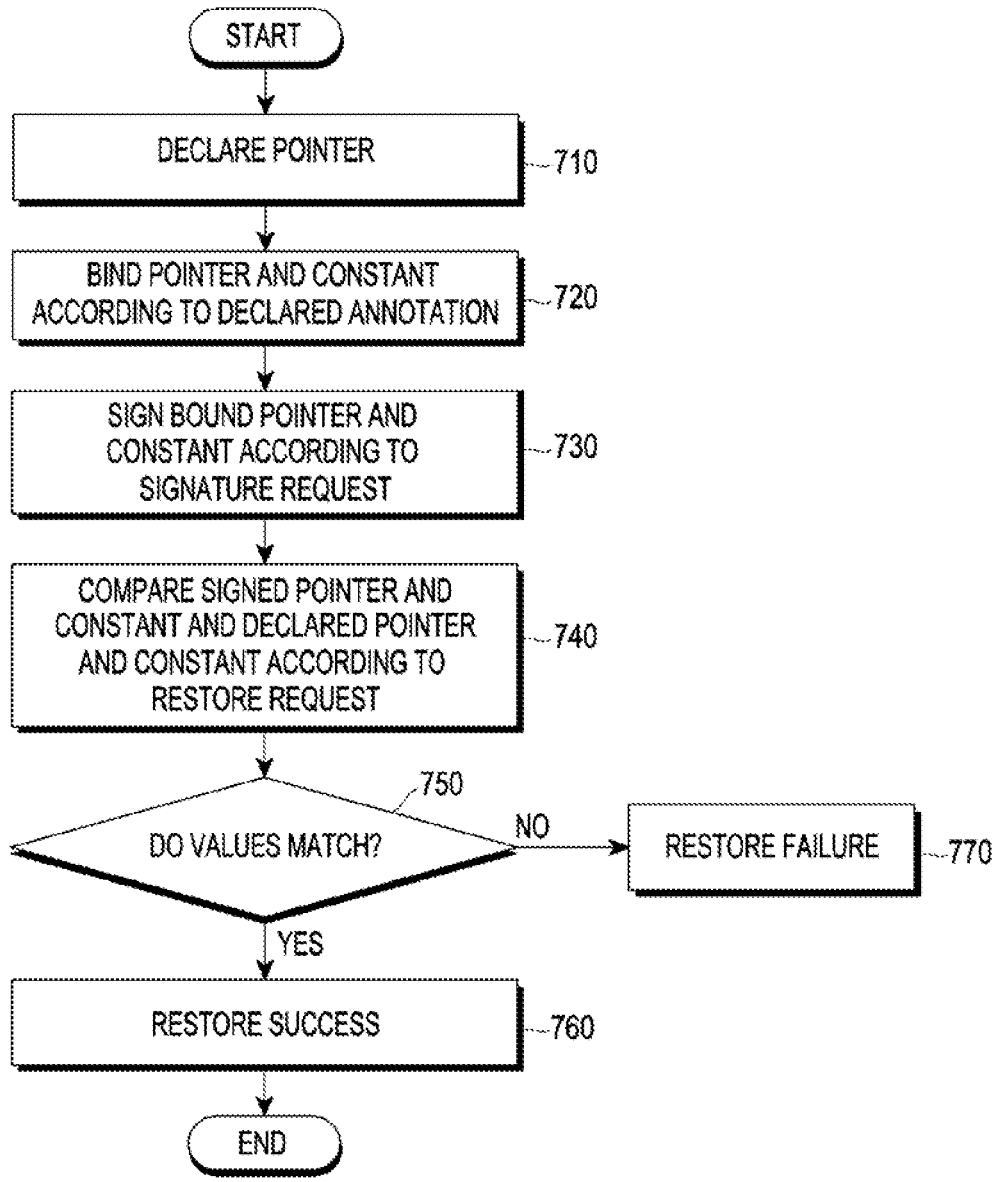
FIG. 7 is a diagram illustrating a method of operating an electronic device according to an embodiment.

FIG. 7 is a flowchart of a method of operating an electronic device 601 according to an embodiment.

Referring to FIG. 7, in operation 710, the electronic device 601 may declare a pointer and a constant. According to an embodiment, the declaration of the pointer may be declared through a declaration statement such as "handler_t handler" as shown in FIG. 8. According to an embodiment, the declaration of the constant may be declared through a declaration statement such as "const char*name;" as shown in FIG. 8. The electronic device 601 according to an embodiment may determine whether an annotation for binding a pointer and a constant to a declaration part of a designated structure is declared. When an annotation such as "attribute_(objbind(handler, name));" is declared, the electronic device 601 may determine that an annotation binding a pointer and a constant is declared in the declaration part of the designated structure.

According to an embodiment, in operation 720, the electronic device 601 may bind a pointer and a constant according to the declared annotation. The electronic device 601 according to an embodiment may bind the pointer and the constant by associating the constant with the pointer. Binding may include at least one of static binding or dynamic binding.

According to an embodiment, the electronic device 601 may sign a pointer and a constant according to a signature request in operation 730. Such an operation is described as a code such as "h→handler=COMBINED_POINTER_SIGN(h→handler, name);" in FIG. 9 according to an embodiment. According to an embodiment, operation 730 may be performed by a compiler according to a declaration of a comment (in other words, automatically without a declaration of a code). Alternatively, the code for performing operation 730 may be previously declared by a developer. When the electronic device 601 identifies the "Int request (const char*name, irq_handler_t handler)" function, as shown in FIG. 9, the electronic device 602 may identify it as a signature request for a bound pointer and constant.

According to an embodiment, electronic device 601 compare the signed pointer and the signed constant with the declared pointer and the declared constant, respectively, according to the restore request, in operation 740. More specifically, the electronic device 601 according to an embodiment may compare "handler" and "name" in "attribute_(objbind(handler, name));", and "handler" and "name" in "h→handler=COMBINED_POINTER_SIGN (h→handler, name);" respectively. Such an operation is described as a code such as "h→handler=CHECK_COMBINED_POINTER_AND_RESTORE (h→handler, name)" in FIG. 10 according to an embodiment. According to an embodiment, operation 740 may be performed by a compiler according to a declaration of a annotation (in other words, automatically without a declaration of code). Alternatively, the code for performing operation 740 may be previously declared by a developer. The electronic device 602 according to an embodiment may identify this as a restore request by identifying a "void dispatcher (const char*name)" function as shown in FIG. 10 as an example.

According to an embodiment, the electronic device 601 may determine whether the respective values match in operation 750. When the declared pointer and the declared constant in operation 710 and the signed pointer and signed constant in operation 730 each have the same value, the electronic device 601 may perform a restore operation in operation 760 and process it as "restore success". When at least one of the pointer and constant declared in operation 710 and the signed pointer and signed constant in operation 730 is not a pointer and/or constant having the same value, in operation 770, the electronic device 601 may process a "restore failure" without performing a restore operation. As described above, unlike the conventional technology, the electronic device 601 according to an embodiment compares both a pointer and a constant value and performs a restore operation, based on the comparison result, thereby ensuring control flow integrity.

According to an embodiment, an electronic device capable of ensuring the integrity of a control flow is disclosed. In the electronic device, all pointers and constants bound by the specified annotation are signed, and when performing a restore operation, restore operation is performed by comparing both the signed pointer value and the signed constant value with the declared pointer value and the declared constant value.

According to an embodiment, a control method of an electronic device capable of ensuring the integrity of a control flow is disclosed. In the control method, all pointers and constants bound by the specified annotation are signed, and when performing a restore operation, the restore operation is performed by comparing both the signed pointer value and the signed constant value with the declared pointer value and the declared constant value.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. The electronic device according to embodiments of the disclosure is not limited to those described above.

Various embodiments as set forth herein may be implemented as software (e.g., the program 640) containing one or more instructions that are stored in a storage medium (e.g., the internal memory 636 or external memory 638) that is readable by a machine (e.g., the electronic device 601). For example, a processor (e.g., the processor 620) of the machine (e.g., the electronic device 601) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the present disclosure has been illustrated and described with reference to various embodiments thereof, the present disclosure is not limited to the specific embodiments described. It will be understood by those skilled in the art that various changes in form and details may be made therein without departing from the spirit and scope of the disclosure.

What is claimed is:

1. An electronic device comprising:
   a memory storing one or more instructions; and
   at least one processor configured to execute the one or more instructions to:
   identify whether an annotation binding a first type object and a second type object is declared, and
   bind the first type object and the second type object, and sign both the bound first type object and the bound second type object based on identifying that the annotation is declared.

2. The electronic device of claim 1, wherein the first type object comprises a pointer, and the second type object comprises a constant.

3. The electronic device of claim 1, wherein the annotation is declared after the second type object is declared.

4. The electronic device of claim 1, wherein the annotation is declared as objbind (handler, name), handler corresponds to the first type object, and name corresponds to the second type object.

5. The electronic device of claim 1, wherein in the second type object and the first type object are concurrently signed.

6. The electronic device of claim 1, wherein the at least one processor is further configured to execute the one or more instructions to restore the signed first type object and the signed second type object according to a restore command for the signed first type object and the signed second type object.

7. The electronic device of claim 1, wherein the at least one processor is further configured to execute the one or more instructions to determine whether a value indicated by the bound second type object and a value indicated by the signed second type object match each other.

8. The electronic device of claim 7, wherein the at least one processor is further configured to execute the one or more instructions to perform a restore based on determining that the value indicated by the bound second type object and the value indicated by the signed second type object match each other.

9. The electronic device of claim 7, wherein the at least one processor is further configured to execute the one or more instructions to process a restore as a failure based on determining that the value indicated by the bound second type object and the value indicated by the signed second type object do not match each other.

10. The electronic device of claim 7, wherein the at least one processor is further configured to execute the one or more instructions to perform a restore operation based on determining that the value indicated by the bound first type object and the value indicated by the signed first type object match each other.

11. A method of controlling an electronic device, the method comprising:

identifying whether an annotation binding a first type object and a second type object is declared; and binding the first type object and the second type object, and signing both the bound first type object and the bound second type object based on identifying that the annotation is declared.

12. The method of claim 11, wherein the first type object comprises a pointer, and the second type object comprises a constant.

13. The method of claim 11, wherein the annotation is declared after the second type object is declared.

14. The method of claim 11, wherein the annotation is declared as objbind (handler, name), handler corresponds to the first type object, and name corresponds to the second type object.

15. The method of claim 11, wherein the second type object and the first type object are concurrently signed.

16. The method of claim 11, further comprising restoring the signed first type object and the signed second type object according to a restore command for the signed first type object and the signed second type object.

17. The method of claim 11, further comprising determining whether a value indicated by the bound second type object and a value indicated by the signed second type object match each other.

18. The method of claim 17, further comprising performing a restore based on determining that the value indicated by the bound second type object and the value indicated by the signed second type object match each other.

19. The method of claim 17, further comprising processing a restore as a failure when the value indicated by the bound second type object and the value indicated by the signed second type object do not match each other.

20. The method of claim 17, further comprising performing a restore operation based on determining that the value indicated by the bound first type object and the value indicated by the signed first type object match each other.

* * * * *